(12) United States Patent
Milby et al.

(10) Patent No.: US 10,042,907 B2
(45) Date of Patent: Aug. 7, 2018

(54) PROVIDING METADATA TO DATABASE SYSTEMS AND ENVIRONMENTS WITH MULTIPLE PROCESSING UNITS OR MODULES

(71) Applicant: Teradata US, Inc., Dayton, OH (US)

(72) Inventors: Gregory Howard Milby, San Marcos, CA (US); Guofang Li, San Diego, CA (US); Kevin Dean Virgil, Oceanside, CA (US); Michael Leon Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 351 days.

(21) Appl. No.: 13/688,767

(22) Filed: Nov. 29, 2012

(65) Prior Publication Data

US 2014/0149349 A1     May 29, 2014

(51) Int. Cl.
*G06F 17/30*     (2006.01)

(52) U.S. Cl.
CPC .............................. *G06F 17/30575* (2013.01)

(58) Field of Classification Search
CPC .................... G06F 17/30224; G06F 17/30575
See application file for complete search history.

(56) References Cited

U.S. PATENT DOCUMENTS

| | | | | |
|---|---|---|---|---|
| 5,317,726 | A * | 5/1994 | Horst | G06F 11/0724 714/12 |
| 6,513,108 | B1* | 1/2003 | Kerr | G06F 15/8023 712/19 |
| 6,785,673 | B1* | 8/2004 | Fernandez | G06F 17/2247 |
| 6,889,309 | B1* | 5/2005 | Oliveira | G06F 3/0607 707/E17.01 |
| 7,174,553 | B1* | 2/2007 | Reed et al. | 718/102 |
| 7,660,793 | B2* | 2/2010 | Indeck et al. | 707/999.005 |
| 2002/0138502 | A1* | 9/2002 | Gupta | 707/200 |
| 2004/0117345 | A1* | 6/2004 | Bamford et al. | 707/1 |
| 2004/0267760 | A1* | 12/2004 | Brundage | G06F 17/30923 |
| 2008/0222492 | A1* | 9/2008 | Earhart | G11B 20/1217 714/774 |
| 2009/0240664 | A1* | 9/2009 | Dinker | G06F 12/0842 |
| 2011/0161291 | A1* | 6/2011 | Taleck | G06F 17/30156 707/622 |
| 2011/0224953 | A1* | 9/2011 | Webster et al. | 703/1 |
| 2015/0032733 | A1* | 1/2015 | Crump | G06F 17/30489 707/722 |

\* cited by examiner

*Primary Examiner* — James Trujillo
*Assistant Examiner* — Hubert Cheung
(74) *Attorney, Agent, or Firm* — Ramin Mahboubian

(57) ABSTRACT

Metadata can be provided to multiple processing units of a database system by using local storages respectively provided for the processing units, such that a local storage is accessible only to its respective processing unit. As a result, processing units can access metadata when needed (e.g., when needed to process a database request at runtime) without having to access a source external to the database system. In addition, metadata (e.g., an XML object, XML schema, XSLT stylesheets, XQuery modules) can be provided using a database request or command, for example, by using a register statement.

18 Claims, 6 Drawing Sheets

```
<xsi:schema xmlns:xsi="http://www.w3.org/2001/XMLSchema"
targetNamespace="http://www.teradata.com/report"
xmlns="http://www.teradata.com/report">
    <xsi:include schemaLocation="tdreport02.xsd"/>
    <xsi:include schemaLocation="http://socal.teradata.com/
schemas/tdreport03.xsd"/>
    <xsi:element name="report" type="ReportType"/>
    <xsi:complexType name="ReportType">
        <xsi:sequence>
            <xsi:element name="date" type="xsi:date"/>
            <xsi:element name="reporter" type="xsi:string"/>
            <xsi:element name="content" type="xsi:string"/>
        </xsi:sequence>
    </xsi:complexType>
</xsi:schema>
```

FIG. 1
PRIOR ART

XSLT stylesheet:

```
<xsl:stylesheet version="1.0" xmlns:xsl=http://www.w3.org/1999/XSL/Transform>
    <xsl:template match="/">
        <xsl:for-each select="report">
            <xsl:apply-template select="date"/>
            <xsl:value-of select="reporter"/>
            <xsl:value-of select="content"/>
        </xsl:for-each>
    </xsl:template>
    <xsl:include href="http://www.teradata.com/xslt/report1.xsl"/>
</xsl:stylesheet>
```

XQuery:

```
import module namespace b = "http://math.com" at "http://math.com/square.xq";
b:square(10)
```

FIG. 2
PRIOR ART

PROVIDING METADATA TO DATABASE SYSTEMS AND ENVIRONMENTS WITH MULTIPLE PROCESSING UNITS OR MODULES

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

The term database can also refer to a collection of data and/or data structures typically stored in a digital form. Data can be stored in a database for various reasons and to serve various entities or "users." Generally, data stored in the database can be used by one or more "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow the users to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

Recently, markup languages have been developed and used extensively in various applications and different aspects of computing systems and environments, including database systems and environments. Generally, Markup languages can be considered as a modern system for annotating a document in a way that is syntactically distinguishable from the text.

More recently, a particular type of a markup language, namely, eXtensible Markup Language (XML) has been developed as a text-based format that can represent structured information. XML can be widely used for the representation of arbitrary data structures. As such, there is a general desire to store XML documents in databases and database systems.

In addition, yet another very recent development is the ANSI SQL/XML, extension to the SQL standard that specifies a SQL-based extension for using XML in conjunction with SQL. In ANSI SQL/XML, a XML data type is introduced, as well as several routines, and functions to support manipulation and storage of XML in databases.

Use of XML ANSI SQL/XML can require a fundamental building block for XML technology, namely "XML Schema." An XML schema can be a description of a class of XML document, typically expressed in terms of constraints on the structure and content of documents of that class. An example of an XML schema declaration is depicted in FIG. 1.

Referring to FIG. 1, typically, a schema declaration includes one or more document references, in which each document reference could potentially be located on either a local server, remote server, or some server out on the World Wide Web. Typically, the documents referenced by the schema declaration need to be collected, pre-processed, and assembled in order to generate a self-contained XML schema that they represent.

In view of the foregoing, it should be noted that techniques for using XML in database systems and environments are useful.

SUMMARY

Broadly speaking, the invention relates to computing environments and systems. More particularly, the invention relates to techniques for providing metadata to database systems.

In accordance with one aspect of the invention, metadata can be provided to multiple processing units of a database system by using local storages respectively provided for the processing units, such that a local storage is accessible only to its respective processing unit, in accordance with one aspect of the invention. As a result, processing units can access metadata when needed (e.g., to process a database request at runtime or when the database system is active and processing database requests) without having to access a source external to the database system. In fact, a processing unit does not even need to access sources of the database system that are external to it (e.g., other processing units) in order to access metadata as it can effectively use its own copy of the metadata that other processing units cannot access. By way of example, a copy of one or more XML objects can be stored in each one of multiple local storages provided as an Unhashed Dictionary table for each one of multiple processing units. In the example, if desired, a local storage may be divided based on various types of metadata. Alternatively, in effect, a separate local storage can be designated for a processing unit for each type of metadata it stores.

In accordance with another aspect of the invention, metadata (e.g., an XML object, XML schema, XSLT stylesheets, XQuery modules) can be provided using a database request or command, for example, by using a register statement that can be provided in accordance with one embodiment of the invention. In addition, registered objects can be obtained and provided for display, for example, by using a "list registered" database request or command.

In accordance with yet another aspect of the invention, metadata can be effectively distributed to each one of local storages designated for each one of multiple processing units of a database system by initially designating one of the processing units as a master that effectively broadcasts the metadata to all of the processing units (including itself), a number of operations to be executed by each one of the processing units in order to effectively register with and store a local copy of metadata in each of the local storages respectively designated for each one of the processing units.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 depicts an example of an XML schema declaration.

FIG. 2 depicts simple examples of XSLT and XQuery requiring access to documents.

DETAILED DESCRIPTION

Figure 3:
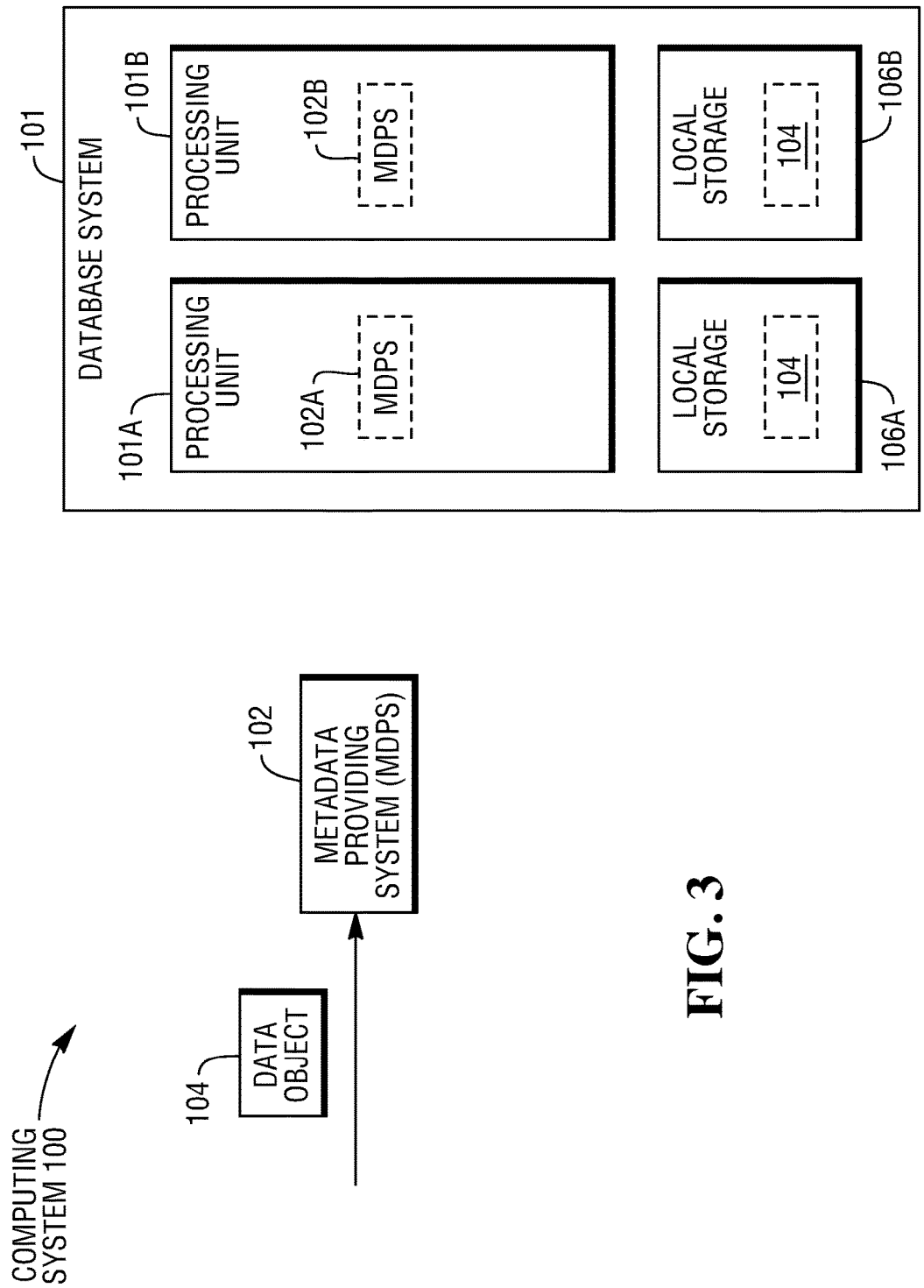
FIG. 3 depicts a computing environment that includes a metadata providing system (MDPS) for a database (or database system) that include multiple processing units in accordance with one embodiment of the invention.
Figure 4:
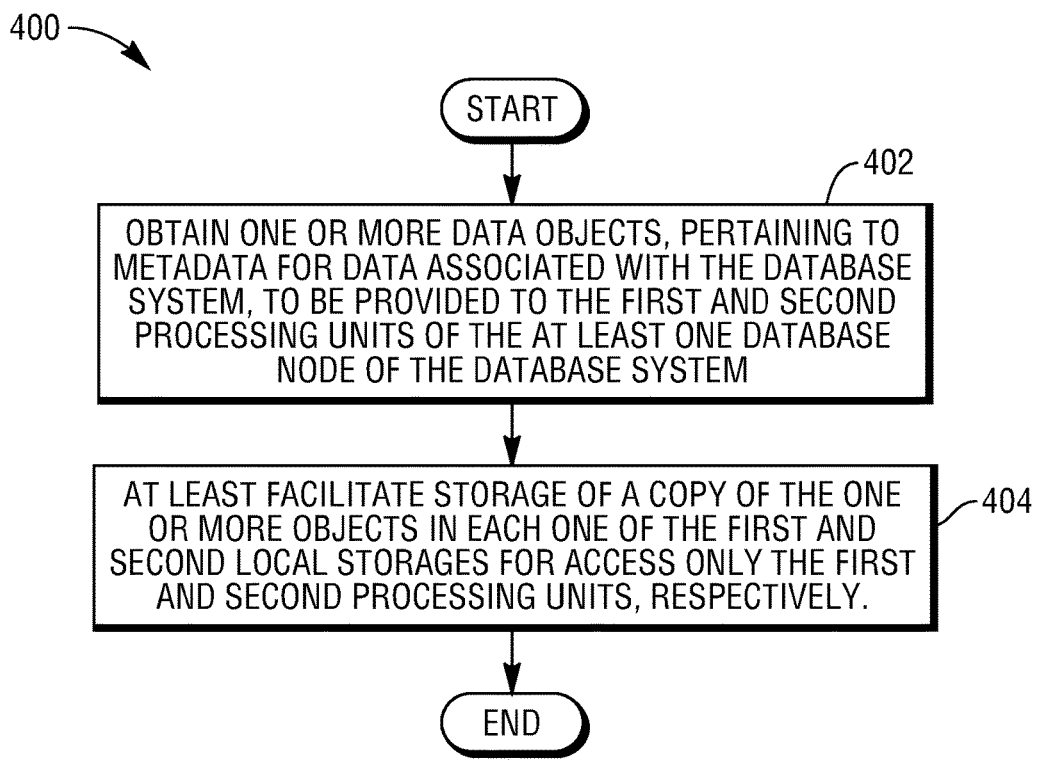
FIG. 4 depicts a method for providing data objects to a database system that includes multiple processing units in accordance with one embodiment of the invention.

As noted in the background section, techniques for using XML in database systems and environments are useful. As shown in FIG. 1, a schema declaration can include one or more document references, in which each document reference could potentially be located on either a local server, remote server, or some server out on the World Wide Web. Typically, these documents must be collected, pre-processed, and assembled in order to generate a self-contained XML schema that they represent.

Generally, a database operation can require access to metadata (e.g., schema declaration depicted in FIG. 1) as well as actual or raw data (e.g., XML documents with the schema declaration depicted in FIG. 1). By way of example, there are several SQL/XML DML operations that require simultaneous access to both a series of XML documents, stored in the database, as well as the XML schema associated with those documents in order for the operations to complete correctly. One issue that has to be solved is how to provide a database with runtime access to metadata (e.g. XML schema) it may need to process data associated with and/or stored in the database (e.g., actual, raw, or structured data provided in a document).

However, it is not desirable to allow the internal components or tasks that implement a database to access the sources external to the database (external database sources) in order to obtain the metadata needed to process data associated and/or stored by the database. As such, for example, permitting the internal tasks that implement the database to access, either a remote server or web-documents, at DML runtime could be a problematic and not a desirable solution as it could subject the internal kernel (or central, non-user space) of the Operating System (OS) of the database to potential hangs and OS crashes that would be out of the kernel ability to control.

This problem also applies to various forms of metadata, including, for example, XSLT stylesheets and XQuery modules, just to name a couple of examples pertaining to XML or XML objects. To elaborate, XSLT can be a declarative, XML-based language used for the transformation of XML documents into other XML documents. XQuery can be considered to be a query and a functional programming language that is designed to query collections of XML data. FIG. 2 depicts simple examples of XSLT and XQuery requiring access to documents that would be downloaded by a conventional database system from the World Wide Web, thereby potentially exposing the database to "hangs" and OS "crashes," as well as potential security risks.

Another consideration is that in some database systems it is not desirable and/or permissible for processing units (or processing modules that process data) to have a common access to data. In other words, it is not desirable and/or permissible to allow processing units to read from or write to the same storage location. In fact, as those skilled in the art will readily appreciate, some database systems are designed using a "share nothing" architecture where processing units (or processing modules) are not to have direct access to data stores of each of other, although they may share information, for example, via an internal network. Consequently, each one the processing units processes data its own storage stored as a local copy of the data and may not directly access data stored in another location locally stored and processed only by another processing unit. As a result, it is not desirable at least in some database systems to merely provide one copy of metadata to be shared among multiple processing units.

In view of the foregoing, improved techniques for providing metadata to database systems, especially, database systems with processing units that are not to directly share data stores, are needed and would be very useful.

Accordingly, it will be appreciated that metadata can be provided to multiple processing units of a database system by using local storages respectively provided for the processing units, such that a local storage is accessible only to its respective processing unit, in accordance with one aspect of the invention. As a result, processing units can access metadata when needed (e.g., to process a database request at runtime or when the database system is active and processing database requests) without having to access a source external to the database system. In fact, a processing unit does not even need to access sources of the database system that are external to it (e.g., other processing units) in order to access metadata as it can effectively use its own copy of the metadata that other processing units cannot access. By way of example, a copy of one or more XML objects can be stored in each one of multiple local storages provided as an Unhashed Dictionary table for each one of multiple processing units. In the example, if desired, a local storage may be divided based on various types of metadata. Alternatively, in effect, a separate local storage can be designated for a processing unit for each type of metadata it stores.

In accordance with another aspect of the invention, metadata (e.g., an XML object, XML schema, XSLT stylesheets, XQuery modules) can be provided using a database request or command, for example, by using a register statement that can be provided in accordance with one embodiment of the invention. In addition, registered objects can be obtained and provided for display, for example, by using a "list registered" database request or command.

In accordance with yet another aspect of the invention, metadata can be effectively distributed to each one of local storages designated for each one of multiple processing units of a database system by initially designating one of the processing units as a master that effectively broadcasts the metadata to all of the processing units (including itself), a number of operations to be executed by each one of the processing units in order to effectively register with and store a local copy of metadata in each of the local storages respectively designated for each one of the processing units.

Other aspects of the invention include retrieval and use metadata stored locally by each one of multiple processing units of a database system.

Embodiments of these aspects of the invention are also discussed below with reference to FIGS. 3-6. However, those skilled in the art will readily appreciate that the detailed description given herein with respect to these figures is for explanatory purposes as the invention extends beyond these limited embodiments.

FIG. 3 depicts a computing environment 100 that includes a metadata providing system (MDPS) 102 for a database (or database system) 101 that include multiple processing units 101A and 101B in accordance with one embodiment of the invention. As will be discussed in greater detail below, each of the processing units 101A and 101B can represent and/or can be effectively provided by one or more physical processors (e.g., Central Processing Units (CPU's)) and/or by one or more virtual processers that can effectively simulate a physical processor. The processing units 101A and 101B can, for example, be provided in or as a database node in a single or multi-node database system 101, wherein each one of the database nodes includes one or more physical processors (not shown) that typically support multiple virtual processing units 101A and 101B operable to process data associated with the database system 101 (e.g., read data stored in the database system 101, write data to the database system 101, process database requests from the database system 101 to answer a query by providing data). Typically, processing units 101A and 10B can be provided as virtual processor supported by at least one physical processor, as those skilled in the art will readily know and appreciate. It should also be noted that generally data can be stored by the database system 101. Typically, each one of the processing units 101A and 101B stores at least a portion of an instance of data, for example, one or more rows of a table in a storage associated with the processing units. For example, the Data can be stored in local storages 106A and 106B respectively provided for the processing units 101A and 101B, or in one or more other storages (not shown). However, it should be noted that metadata can be provided in local storages 106A and 106B as will be described in greater detail below.

Referring to FIG. 3, MDPS 102 is operable to provide metadata for the data associated with the database system 101. The metadata can, for example, be XML data or an XML object (e.g., XML schema) needed to process data stored in a form consistent with one or more XML documents. As another example, the metadata can include data Geospatial data provided for analysis in applying statistical analysis and other informational techniques to data which has a geographical or geospatial aspect. As yet another example, the metadata can include configuration information for configuring various aspects of a data and/or a database system.

It will be appreciated that MDPS 102 can, for example, be implemented in hardware and/or software by using one or more hardware and/or software components. A such, the MDPS 102 can, for example, be effectively implemented by computer executable code stored on a computer readable medium (not shown) and can be executed by one or more processors (not shown). Those skilled in the art will readily appreciate that the processors can be part of a device (not shown) for example, a computer or computing device.

Those skilled in the art will also readily know and appreciate that the MDPS 102 can also be provided at least in part by the one or more of the processing units 101A and 101B. In other words, one or more MDPS components 102A and 102B (shown in dashed lines) can be provided as local components instead, or in addition, to the MDPS component 102 that can serve alone, or as a central entity coupled to the local components 102A and 102B. As such, the MDPS 102 can at least partly be provided by the components 102A and 102B provided as components that are respectively local to the processing units 101A and 101B. It should also be noted that the MPDS 102 can also be provided at least partly as one or more components that are independent and/or external to the database system 101. As shown in FIG. 3, typically, it is desirable to provide the MDPS 102 as a central component with one or more local components 102A and 102B respectively associated with processing nodes 101A and 101B.

In any case, referring to FIG. 3, conceptually, the MDPS 102 can obtain (e.g., receive, search and download) one or more objects 104 pertaining to metadata for data associated with the database system 101 (database objects). By way of example, the MDPS 102 can receive as input a database request, or command, that identifies one or more objects as one or more XML schema documents needed for processing one or more XML documents stored by the database system 101. In the example, the database request or command can also indicate the location where the XML data can be obtained. As such, the MDPS 102 can, for example, be operable to obtain the XML data over the Internet in response to a database command or request that identify them and indicates their location.

Generally, however, after obtaining one or more database objects 104 pertaining to metadata, MDPS 102 can at least facilitate their storage in local storages 106A and 106B, respectively provided only for access by the processing unit 101A and processing unit 101B. In other words, a copy of the database objects 104 can be stored for use by each one of the processing units 101A and 101B in their respective local storages 106 and 106B, each designated for access only by their own respective processing unit. As a result, the processing units 101A can obtain the data objects 104 by accessing its own local storage 106A but would not be able to access the copy of the database objects 104 in the local storage 106B provided for the processing units 101B. Similarly, the database node 101B can obtain the data objects 104 by accessing its own local storage 106B but would not be able to access the copy of the database objects 104 in the local storage 106A provided for the processing units 101A. In addition, neither one of the database nodes 101A and 101B need to make an external access in order to obtain the data objects 104 since it is available from their respective local storage (106A and 106B).

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 5, it should be noted that a central metadata providing system component (MDPS) 1002 can be provided for the database node $1105_1$. In addition, each one of the processing units $1110_{1-N}$ can be effectively provided with a local MDPS component $1002_{1-N}$.

A database request or command 1006 can be provided by the client-side host 1004 and received by the parsing engine 1005. The database request or command 1006 can be indicative of the metadata associated with the database system 1000. In accordance with one embodiment, the database request or command 1006 can be a request for registering metadata with the database system 1000.

By way of example, a DDL statement: ("REGISTER: XML SCHEMA|XSLT STYLESHEET|XQUERY MODULE) can be provided to facilitate registration of XML objects including one or more of: an XML schema, an XSLT Stylesheet, and an XQuery module. Similarly, a list registered data objects can be provided and used the database request or command 1006 in accordance with one embodiment of the invention. By way of example, a DDL statement can be provided to allow a SQL user to list a specified type of registered XML objects and/or to display one particular type of a registered XML object (e.g., XQuery modules).

Typically, an internal representation (e.g., a Parse Tree) of a database request or command 1006 can be stored and used by the parsing engine 1130. As such, a DDL statement for registering or listing registered database objects can, for example, be stored as a dedicated parse tree in the parsing engine 1130 as it internal representation. Generally, work associated with solving a database request 1004 (e.g., a DDL query, a DML query) can be provided by the parsing engine 1130 as a series of work steps. As such, for example, a "REGISTER DDL" statement, internally represented as a new dedicated Parse Tree by the parsing engine 1130 will have at least one dedicated new work step associated with the registration operation: "the registration work step." Similarly, a "LIST REGISTERED DDL" statement will have at least one work step, namely its own work step: "the repository show step." It should be noted that for each type of metadata there can be a special, separate storage (or repository). For example, for each type of XML objects including XML schema, XSLT stylesheet and XQuery modules, there can be a designated repository provided as an Unhashed Dictionary table, present on each and every processing units $1110_{1-N}$.

As noted above, registering metadata can, for example, be done via a register statement provided as a database command, request, or statement 1006. By way of example, a user of the database system 1000 can place all relevant files on the client-side host 1004 and issue a registration command, request, or statement 1006 for the purpose of registering a particular XML object. This registration command, request, or statement 1006 can, for example, be of the form:

---

REGISTER <XML SCHEMA|XSLT STYLESHEET|XQUERY MODULE>
<object_name> <object_value>
[referred_doc_location_1 referred_doc_content_1,
referred_doc_location_2 referred_doc_content_2
, ...]
Where:
   "object_name" is an in-database identifier for the to-be-registered
   object.
   "object_value": is content of the object.
   "referred_doc_location_n": is a location of the document that can,
   for example, be used to identify itself in the assembled object.
   "referred_doc_content_n": is the content of the document.

---

The parsing engine 1130 can parse the statement above into its associated dedicated registration parse tree. For example, computer code provided in a kernel of an operating system operating on the database node $1105_1$ of the database system 1000 can effectively parse the statement, as those skilled in the art will readily know. In addition, a dedicated parse tree can eventually be turned into a dedicated registration work step by the parsing engine 1130. The registration work step can be broadcasted to all of the processing units (e.g., AMPs) 1110$_{1-N}$.

The registration work step can be then processed as described below in an exemplary process which uses XML in view of its current prevalence as an example of metadata that can be registered with a database system in accordance with one embodiment of the invention.

Figure 5:
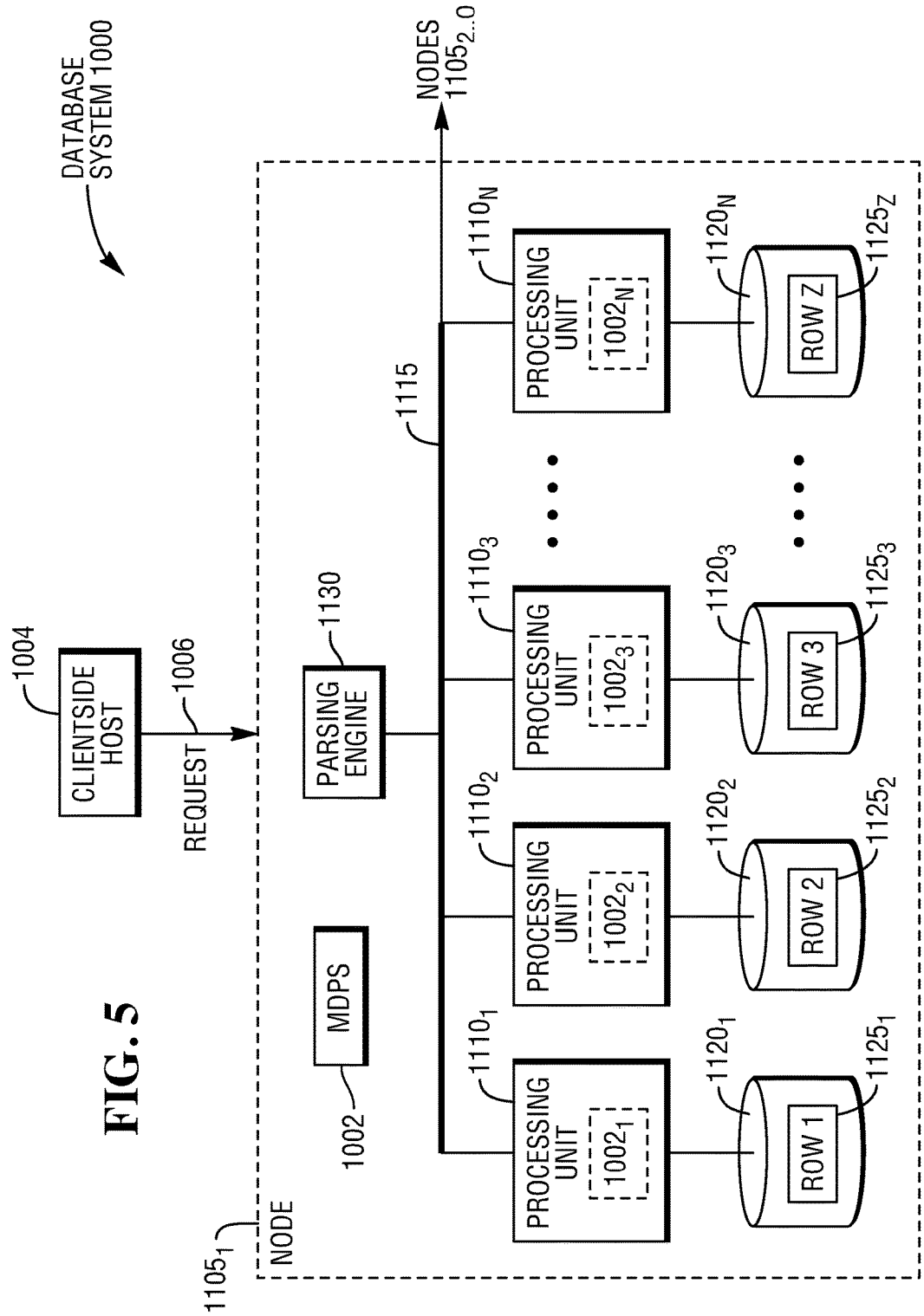
FIG. 5 depicts a database node of a database system or a Database Management System (DBMS) in accordance with one embodiment of the invention.

Specifically, referring to FIG. 5, a single one of the processing units 1110$_{1-N}$ can behave as a master with respect to other processing units and itself. The master processing unit can, for example, use the underlying database mechanism (e.g., CLI) to bring all the files that are to be assembled into a self-contained XML object. The master processing unit can then process the files and assemble the XML object, for example, into a self-contained XML object. Thereafter, the master processing unit can broadcast the object (e.g., a self-contained XML object) to all other processing units, including itself (the master processing unit). Consequently, all of the processing units can behave as slaves in this context with respect to the broadcast made by the master processing unit. In response to the broadcast, all of the processing units can store a copy of a common XML object into their local storages 1200$_{1-N}$, for example provided as unhashed dictionary repository. As those skilled in the art will readily appreciate, the local storages 1120$_{1-N}$ can at least be conceptually separate from the storages 1120$_{1-N}$, or provided as designated locations of the storages 1120$_{1-N}$.

In any case, as a result of the broadcast, all of the processing units 1110$_{1-N}$ can have an identical XML object 1200$_{1-N}$ in their local repositories. The last processing unit 1110$_{1-N}$ to complete the storing can send an operation complete message back to the parsing engine 1130 to effectively signal the completion of the registration operation.

Although the foregoing used XML objects as an example, it will readily be appreciated that the techniques noted above can be used to register virtually any type of metadata (e.g., Geospatial data, configuration data) as the techniques do not place any constraints on the type of metadata that can be registered with a database system.

Furthermore, it should be noted that when an object has been registered with the database system 1000, any operation (e.g., a DML that contains an XML operation requiring access to the XML object) can be accommodated simply by modifying its work steps to reference a specific one of the local repositories 1200$_{1-N}$ of a particular processing unit 1110$_{1-N}$ in order to access the registered object.

Also, a list or display of the registered objects can be accomplished by sending its work step to one of the processing units 1200$_{1-N}$ that can, for example be randomly selected. By way of example, a list or display of the registered objects for XML objects can be provided as: SHOW REGISTERED <XML SCHEMA|XSLT STYLESHEET|XQUERY MODULE> [object_name], where "object_name" is the registered object name which is specified when registering the object. However, if the "object_name" is absent, all registered XML object names for the specified type can be listed. Otherwise, the specified XML object value can be returned. Since each registered XML object may consist of multiple documents, content of all of them will be displayed. It should also be noted that data consistency between object registrations, listing, displaying and operations requiring access to the repositories can, for example, be achieved by inserting an appropriate lock work step(s) in the operational flow (e.g., in DDL and XML DML operational flows). For example, a read table lock can be placed on a local storage 1200$i$ (shown in FIG. 4) provided as an unhashed dictionary table, every time a DML XML operation, or a display object DDL statement, is issued that may require access to the unhashed dictionary table. Similarly, a write table lock can be placed on the unhashed dictionary table, every time a XML registration DDL statement is issued. If a write lock finds that there are currently readers associated with the unhashed table, it can merely block and wait for all the reader to finish.

Figure 6:
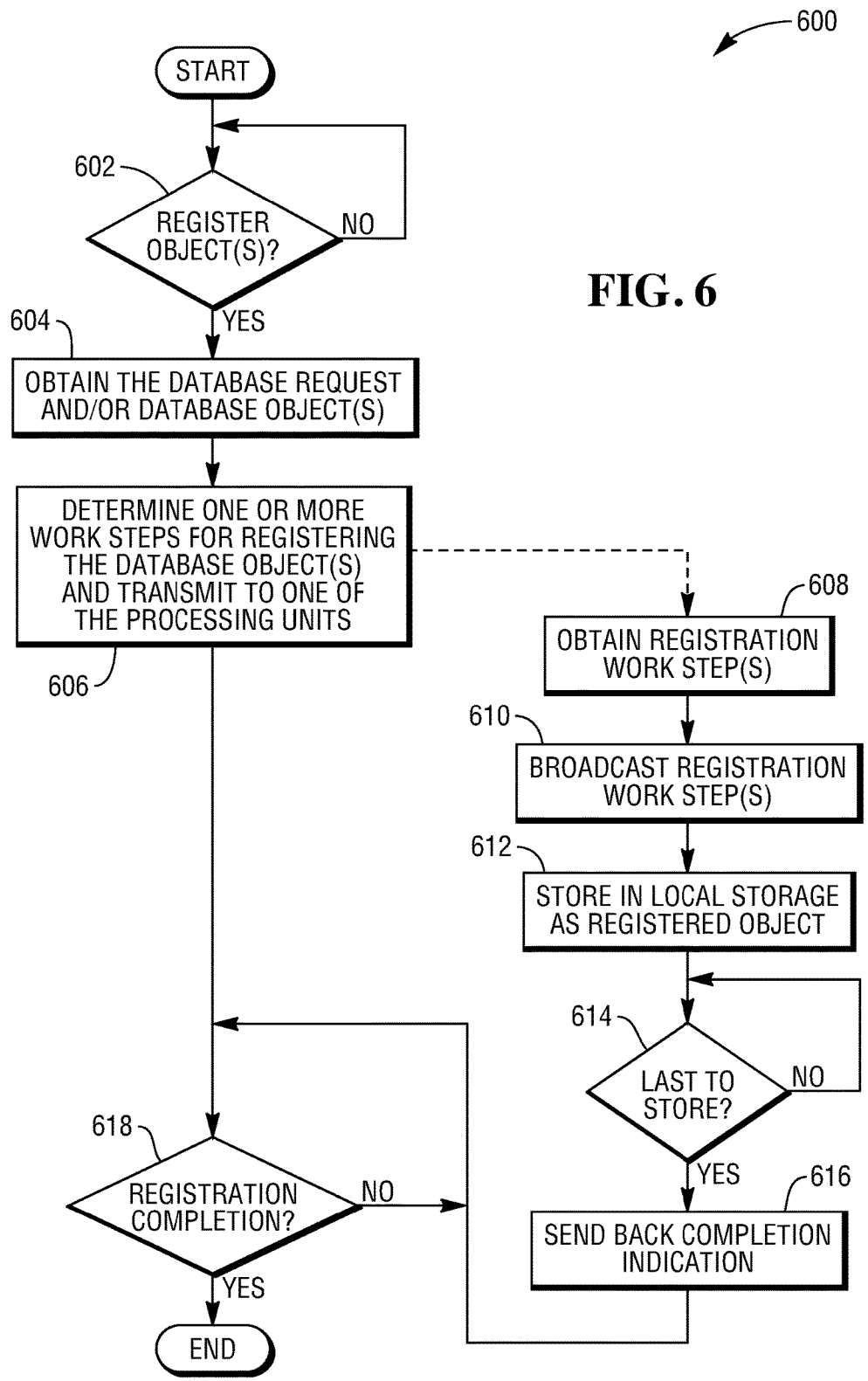
FIG. 6 depicts a method for providing data objects to a database system that includes multiple processing units in one or more database nodes in accordance with another embodiment of the invention.

To elaborate still further, FIG. 6 depicts a method 600 for providing data objects to a database system that includes multiple processing units in one or more database nodes in accordance with another embodiment of the invention. It should be noted that the each of the database nodes can include at least one processor operable to process at least one portion of data for the database system. Also, at least one of the database nodes can include first and second processing units and first and second local storages that can be accessed only by the first and second processing units, respectively. Method 600 can, for example, be used by the database system 101 (shown in FIG. 3).

Referring to FIG. 6, initially, it is determined (602) whether to register one or more objects. In effect, method 600 can wait for a determination (602) that one or more objects are to be registered. Typically, a database request can be made to register one or more database objects. The database request can provide the database objects and/or a reference to their location. As such, if it is determined (602) that one or more objects are to be registered, one or more database requests identifying one or more database and/or the database objects themselves (i.e., content of database object(s)) can be obtained (604) for registration. Next, one or more tasks or work steps for registering the database object(s) can be determined (606) for multiple processing nodes and transmitted (606) to one of the processing units that can, for example, be selected at random, to serve as a master processing units with respect to other processing unit(s) and the determined (606) tasks or step for registering the database object(s).

As suggested by FIG. 6, the one or more tasks or work steps can be obtained (608) by the processing unit selected to serve as a master (master processing unit). The master processing unit can then broadcast (610) the task(s) or work step(s) to all processing units, including the master processing unit itself. For example, the processing units can be part of a database node of a multi-node database system. In any case, after the task(s) or work step(s) for registration of the database object(s) have been broadcasted, each one of the processing units, including the master processing unit itself, can store (612) the perform the task(s) or work step(s) for registration of the database object(s) to effectively store one or more database objects in their local storage that is not accessible to another processing unit. In effect, the last processing unit determined (614) to be the last one to complete the task(s) or work step(s) for registration and storage of the one or more database object(s) can send back a completion indication so that it can be determined that the registration has been successfully completed before the method 600 ends.

It will readily be understood that in case of an error, an error message can be used, and the method 600 may attempt to retry and/or take remedial action to correct a problem, although for the sake of brevity this is not depicted in FIG. 6. Those skilled in the art will also readily appreciate that a method can be provided to list one or more registered objects in accordance with one or more techniques noted above.

Generally, the various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of providing data objects to a database system that includes multiple processing units in one or more database nodes that each include at least one processor configured to process at least a portion of data for the database system, wherein at least one of the database nodes includes first and second processing units, and first and second local storages that can be accessed only by the first and second processing units, respectively, and wherein the computer-implemented method comprises:

obtaining one or more data objects, pertaining to metadata describing the organization of data stored in the database system and needed for processing of database queries of the data stored in the database system, to be provided to at least the first and second processing units of the at least one database node of the database system;

storing a copy of the same one or more obtained objects pertaining to the metadata in each one of the first and second local storages for access only by the first and second processing units, respectively, wherein each one of the first and second local storages are partitioned into multiple portions for storing multiple types of database objects pertaining to organization of data stored in the database system, wherein the storing or at least facilitating storage of a copy of the one or more obtained objects stores or at least facilitates storage of the copy of the one or more obtained objects in a respective portion of the first and second local storages corresponding to the type of the one or more obtained objects;

allowing each one of the first and second processing units to access its own copy of the one or more database objects pertaining to the metadata, stored in its respective one of the first and second local storages by searching its own local storage, without sharing its own copy with the other one of the first and second processing units;

allowing each one of the first and second processing units to access its own copy of the one or more database objects pertaining to the metadata, stored in its respective one of the first and second local storages by searching its own local storage, without accessing data from an external source being external to the database system; and searching, by each one of the multiple database nodes, its own copy of the one or more database objects pertaining to the metadata needed for processing of the database queries of the data stored in the database system, in response to the database queries of the database.

2. The computer-implemented method of claim 1, wherein the external source can be accessed by the database system via a computer network.

3. The computer-implemented method of claim 2, wherein the computer network is one of the following: the Internet, a public network, a computer network that is not secured.

4. The computer-implemented method of claim 1, wherein at least one of the first and second local storages includes a local unhashed dictionary repository that can be searched by each one of the multiple database nodes to retrieve the one or more objects.

5. The computer-implemented method of claim 4, wherein the local unhashed dictionary repository is partitioned into multiple portions for storing multiple types of the one or more database objects.

6. The computer-implemented method of claim 1, wherein the one or more data objects include one or more eXtensible Markup Language (XML) objects or XML data.

7. The computer-implemented method of claim 6, wherein the one or more XML objects include at least one of: one or more XML schema, one or more eXtensible Stylesheet Language Transformation (XSLT) stylesheet, and one or more XQuery modules.

8. The computer-implemented method of claim 1, wherein the obtaining of the one or more data objects pertaining to metadata associated with the database system comprises:

receiving a database request that includes the one or more database objects, and wherein the facilitating of the storage of the copy of the one or more objects in each one of the first and second local storages for access only the first and second processing units comprises:

storing the one or more objects in each of respective local unhashed dictionary repositories of the processing units that can be searched by each one of the processing units to retrieve the one or more objects in response to a database request requiring the one or more database objects.

9. The computer-implemented method of claim 8, wherein the database request includes a Structured Query Language (SQL) registration request or command that can be input by a user of the database system, and wherein the database request requiring the one or more database objects is a SQL list registered data that can be input by a user of the database system.

10. The computer-implemented method of claim 9, wherein the computer-implemented method further comprises: determining, at the first processing unit, to access the one or more data objects; looking up the one or more objects, by the first processing unit, a first local storage of the local storages designated for access only by the first database node; thereafter, accessing by the processing unit, the first local storage to retrieve the one or more data objects for processing data associated with the database system.

11. The computer-implemented method of claim 1, wherein the database nodes are shared nothing database nodes arranged not to share access to data.

12. An apparatus that includes one or more processors configured to:

provide data objects to a database system that includes multiple processing units in one or more database nodes that each include at least one processor configured to process at least a portion of data for the database system, wherein at least one of the database nodes includes first and second processing units, and first and second local storages that can be accessed only by the first and second processing units, respectively;

obtain one or more data objects, pertaining to metadata describing the organization of data stored in the database system and needed for processing of database queries of the data stored in the database system, to be provided to at least the first and second processing units of the at least one database node of the database system;

store a copy of the same one or more obtained objects pertaining to the metadata in each one of the first and second local storages for access only by the first and second processing units, respectively, wherein each one of the first and second local storages are partitioned into multiple portions for storing multiple types of database objects pertaining to organization of data stored in the database system, wherein the storing or at least facilitating storage of a copy of the one or more obtained objects stores or at least facilitates storage of the copy of the one or more obtained objects in a respective portion of the first and second local storages corresponding to the type of the one or more obtained objects;

allow each one of the first and second processing units to access its own copy of the one or more database objects pertaining to the metadata, stored in its respective one of the first and second local storages by searching its own local storage, without sharing its own copy with the other one of the first and second processing units;

allow each one of the first and second processing units to access its own copy of the one or more database objects pertaining to the metadata, stored in its respective one of the first and second local storages by searching its own local storage, without accessing data from an external source being external to the database system; and allow searching, by each one of the multiple database nodes, its own copy of the one or more database objects pertaining to the metadata needed for processing of the database queries of the data stored in the database system, in response to the database queries of the database.

13. The apparatus of claim 12, wherein the external source can be accessed by the database system via a computer network.

14. The apparatus of claim 13, wherein the computer network is one of the following: the Internet, a public network, a computer network that is not secured.

15. The apparatus of claim 12, wherein at least one of the first and second local storages includes a local unhashed dictionary repository that can be searched by each one of the multiple database nodes to retrieve the one or more objects.

16. The apparatus of claim 12, wherein at least one of the first and second local storages includes a local unhashed dictionary repository that can be searched by at least one of the multiple database nodes to retrieve the one or more objects.

17. The apparatus of claim 16, wherein the local unhashed dictionary repository is partitioned into multiple portions for storing multiple types of the one or more database objects.

18. A non-transitory computer readable storage medium storing at least computer executable code configured to provide data objects to a database system that includes multiple processing units in one or more database nodes that each include at least one processor configured to process at least a portion of data for the database system, wherein at least one of the database nodes includes first and second processing units, and first and second local storages that can be accessed only by the first and second processing units, respectively, and wherein the executable computer code when executed is configured to:

obtain one or more data objects, pertaining to metadata describing the organization of data stored in the database system and needed for processing of database queries of the data stored in the database system, to be provided to at least the first and second processing units of the at least one database node of the database system;

store a copy of the same one or more obtained objects pertaining to the metadata in each one of the first and second local storages for access only by the first and second processing units, respectively, wherein each one of the first and second local storages are partitioned into multiple portions for storing multiple types of database objects pertaining to organization of data stored in the database system, wherein the storing or at least facilitating storage of a copy of the one or more obtained objects stores or at least facilitates storage of the copy of the one or more obtained objects in a respective portion of the first and second local storages corresponding to the type of the one or more obtained objects;

allow each one of the first and second processing units to access its own copy of the one or more database objects pertaining to the metadata, stored in its respective one of the first and second local storages by searching its own local storage, without sharing its own copy with the other one of the first and second processing units;

allow each one of the first and second processing units to access its own copy of the one or more database objects pertaining to the metadata, stored in its respective one of the first and second local storages by searching its own local storage, without accessing data from an external source being external to the database system; and search, by each one of the multiple database nodes, its own copy of the one or more database objects pertaining to the metadata needed for processing of the database queries of the data stored in the database system, in response to the database queries of the database.

* * * * *